(12) United States Patent
Hakonarson et al.

(10) Patent No.: US 12,022,811 B2
(45) Date of Patent: Jul. 2, 2024

(54) AUTOMATIC GRADING SYSTEM FOR LIVING AQUATIC ORGANISMS

(71) Applicant: VAKI FISKELDISKERFI HF, Kopavogur (IS)

(72) Inventors: Sverrir Hakonarson, Reykjavik (IS); Gunnar Sigvaldi Hilmarsson, Reykjavik (IS); Albert Ingi Haraldsson, Reykjavik (IS); Hermann Kristjansson, Gardabaer (IS)

(73) Assignee: Vaki Fiskeldiskerfi HF, Kopavogur (IS)

( * ) Notice: Subject to any disclaimer, the term of this patent is extended or adjusted under 35 U.S.C. 154(b) by 267 days.

(21) Appl. No.: 17/036,204

(22) Filed: Sep. 29, 2020

(65) Prior Publication Data

US 2021/0076645 A1 Mar. 18, 2021

Related U.S. Application Data

(63) Continuation of application No. 15/505,575, filed as application No. PCT/IS2015/050015 on Aug. 27, 2015, now Pat. No. 10,785,965.

(30) Foreign Application Priority Data

Aug. 27, 2014 (IS) .............................. 9053

(51) Int. Cl.
*A01K 61/95* (2017.01)
*A01K 61/90* (2017.01)
*G06M 7/02* (2006.01)

(52) U.S. Cl.
CPC .............. *A01K 61/95* (2017.01); *A01K 61/90* (2017.01); *G06M 7/02* (2013.01)

(58) Field of Classification Search
CPC .......... A01K 61/90; A01K 61/95; G06M 7/02
See application file for complete search history.

(56) References Cited

U.S. PATENT DOCUMENTS

| 2,690,158 A | * | 9/1954 | Petty | ....................... B07C 5/065 |
| | | | | 119/216 |
| 3,096,600 A | * | 7/1963 | Gwyther | ................ A01K 61/90 |
| | | | | 43/100 |

(Continued)

FOREIGN PATENT DOCUMENTS

| CN | 103761565 A | 4/2014 |
| CN | 204031346 U | 12/2014 |

(Continued)

OTHER PUBLICATIONS

Ueno, JP 2001045905 translation, retrieved from EPO Sep. 6, 2022 (Year: 2001).*

(Continued)

*Primary Examiner* — Kristen C Hayes
(74) *Attorney, Agent, or Firm* — Polsinelli PC; Gregory P. Durbin

(57) ABSTRACT

A device for grading aquatic organisms is disclosed. The device includes a pump, a grader, two or more receptacles for receiving aquatic organisms from the grader, a counter, and a control system. The grader comprises a rotating barrel with a plurality of chambers, a bottom part of each of the plurality of chambers having an adjustable slit. The control system is designed to adjust at least one of a rotation rate of the grader or a slit setting of the grader based on information from the counter.

18 Claims, 4 Drawing Sheets

(56) References Cited

U.S. PATENT DOCUMENTS

| | | | | |
|---|---|---|---|---|
| 2004/0244712 A1* | 12/2004 | Massey | ............... | A01K 61/90 119/216 |
| 2006/0266297 A1* | 11/2006 | McRobert | ............ | A22C 25/04 119/216 |
| 2011/0114029 A1* | 5/2011 | Chu | ................. | A01K 61/90 377/6 |
| 2022/0030836 A1* | 2/2022 | Boegner | ............. | A01K 61/95 |

FOREIGN PATENT DOCUMENTS

| | | | |
|---|---|---|---|
| CN | 204350129 U | | 5/2015 |
| CN | 106454268 A | | 2/2017 |
| CN | 206023994 U | | 3/2017 |
| CN | 206077585 U | | 4/2017 |
| CN | 106719250 A | | 5/2017 |
| CN | 206165510 U | | 5/2017 |
| CN | 206324008 U | | 7/2017 |
| CN | 206324013 Y | | 7/2017 |
| CN | 206370898 U | | 8/2017 |
| CN | 107347128 A | | 11/2017 |
| CN | 107370912 A | | 11/2017 |
| CN | 206878988 U | | 1/2018 |
| CN | 108323471 A | | 7/2018 |
| CN | 108414024 A | | 8/2018 |
| CN | 207732878 U | | 8/2018 |
| CN | 207897706 U | | 9/2018 |
| CN | 108632508 A | | 10/2018 |
| CN | 109640035 A | | 4/2019 |
| EP | 2559336 A1 | | 2/2013 |
| EP | 2618655 A1 | | 7/2013 |
| EP | 2962556 A1 | | 1/2016 |
| JP | H09245146 A | | 9/1997 |
| JP | 2001045905 A | * | 2/2001 |
| JP | 2001045905 A | | 2/2001 |
| KR | 20050038929 A | | 4/2005 |
| KR | 20180123198 A | | 11/2018 |
| NO | 20013352 A | | 1/2003 |
| NO | 314481 B1 | | 3/2003 |
| NO | 332103 B1 | | 6/2012 |
| NO | 20151649 A1 | | 6/2017 |
| WO | 1992/12627 | | 8/1992 |
| WO | WO-03092369 A1 * | 11/2003 | ............ A01K 61/90 |
| WO | 2005025309 A1 | | 3/2005 |
| WO | 2009008733 A1 | | 1/2009 |
| WO | 2011115496 A1 | | 9/2011 |
| WO | 2012008843 A1 | | 1/2012 |
| WO | 2013053597 A1 | | 4/2013 |
| WO | 2013080351 A1 | | 6/2013 |
| WO | 2013108251 A2 | | 7/2013 |
| WO | 2014098614 A1 | | 6/2014 |
| WO | 2014116120 A1 | | 7/2014 |
| WO | 2015173837 A1 | | 11/2015 |
| WO | 2016030915 A1 | | 3/2016 |
| WO | 2016048851 A1 | | 3/2016 |
| WO | 2016116533 A1 | | 7/2016 |
| WO | 2017204660 A1 | | 11/2017 |
| WO | 2018011745 A1 | | 1/2018 |
| WO | 2018222048 A1 | | 12/2018 |
| WO | 2019008330 A1 | | 1/2019 |

OTHER PUBLICATIONS

Written Opinion issued in corresponding Chilean Patent Application No. 201700459, dated Nov. 16, 2018, 10 pages.

International Search Report and Written Opinion, International Application No. PCT/IS2015/050015, dated Dec. 9, 2015, 12 pages.

European Patent Office, Communication Pursuant to Article 94(3) EPC, issued in connection with co-pending European Application No. 21158556.7, dated Dec. 12, 2023.

Patent examination report 1, New Zealand Patent Application No. 767483, dated Jun. 22, 2021, 3 pages.

* cited by examiner

AUTOMATIC GRADING SYSTEM FOR LIVING AQUATIC ORGANISMS

CROSS REFERENCE TO RELATED APPLICATIONS

This application is a continuation of U.S. patent application Ser. No. 15/505,575, filed on Feb. 21, 2017, which is a national stage entry of International Patent Application No. PCT/IS2015/050015, filed on Aug. 27, 2015, which claims priority to Iceland Patent Application No. 9053, filed on Aug. 27, 2014, all of which are incorporated herein by reference in their entirety.

FIELD

The invention relates to a device, a system and a method for grading aquatic organisms into batches by using a central control system that controls the grading process in a continuous manner resulting in optimization of the grading process.

INTRODUCTION

It's common practice in fish-farming to grade fish into batches according to e.g. size and number. The number of organisms in a batch and the size-range is variable. Systems and devices for grading, counting and sorting organisms in water were the object is to give the optimal batching based on number and size of organism are widely used in fish farming. These devices are often limited in their capacity of processing large amounts of fish in a short time interval. The relatively unstable concentration of the fish in water going through the handling systems at any time demands accurate and fast grading systems.

WO2013080351 discloses a counting device for counting objects ranging from small objects such as larval shrimp, to objects of more than 100 mm in length. The counting device, has an integrated counting unit having an inclined counting channel which transports the objects to be counted in a flow of a fluid, a lighting section which shines light on the counting section from below and an image analysis section that by means of a camera placed on the upper side of the counting section, loads a counting image, and that on the basis of the data of the loaded image, measures the number of objects that together with the fluid, pass through the counting section.

WO9212627 discloses a device which separates animals automatically into aquacultural units. The said device comprises a retaining grille with openings closed by doors allowing the passage in a single direction to another unit animals meeting the selection criteria (size, weight, color, etc.). The selection is made by an analyzer, which checks the animals to determine whether or not they may pass through.

WO2013108251 discloses device and method for guiding fish from a reservoir to a desired destination. The device comprises a water reservoir for containing fish and having an inlet and an outlet, conduits connected to the outlet and inlet and a space reducing assembly within the reservoir. One conduit serves for guiding a fish flow to a desired location, having a size and shape configured for receiving only one fish at a given time from the reservoir. Another conduit is configured for introducing water into the reservoir to create a water current within the reservoir directed toward the outlet of the reservoir joined to the inlet of the first conduit. The space reducing assembly is provided to gradually reduce a volume of water containing the fish in the vicinity of the inlet of the first conduit thereby forcing the fish toward the inlet of the first conduit. The water current in the reservoir prevent crowding the fish at the inlet of the first conduit and allow the fish to successively enter the first conduit one fish at a time. None of the above systems are closely related to the system disclosed herein.

SUMMARY

The objective of the present invention is to provide system, a method and a device for optimal grading process for organisms in fluid by optimizing the individual grading components on-the-fly utilizing feed-back loops. The invention provides a device, a system and a method to optimize the process of grading fish into batches by controlling the entire process with a software on a computer and a data stored in a database. The process consists of the steps of pumping the organisms from a receptacle and optionally through a concentration control device, and from thereon grading the organisms according to size in a specific grader and then to counting the number of organisms graded into each batch. In order for this process to operate smoothly, all the equipment used must be fine-tuned, preferably continuously throughout the process.

The present invention in useful in industry, not only for the purpose of enabling the currently existing equipment to operate at the ideal level of throughput, but also as a new standard of concentration control for which future devices can be designed to exploit.

It is an object of the present invention to overcome or ameliorate the aforementioned drawbacks of the prior art and to provide an improved and/or alternative and/or additional device for optimized automatic and continuous grading of a flow of living organism in a fluid. It is one preferred object of the present invention to provide a device comprising in-feed channels for a flow of living organism and a flow of fluid, as well as optionally a chamber for regulating the flow from the first and the second in-feed channel through the chamber. Another preferred object of the present invention is to provide a device wherein a computer and a sensor continuously and automatically regulate the ratio of flow from the in-feed channels by the lever in response to the density of living organism in the flow determined by the sensor.

Moreover, it is a preferred object of the present invention to provide a method and a device for grading living organism dispersed in fluid, where the grading unit comprises a pump, a grader and a counter. Furthermore, the counter sends grading information to the concentration control chamber, the pump and the grader and through feedback loops between the individual components of the system, settings for the components are adjusted to optimize the grading process through the use of software and user data in a database. It is also a preferred object of the present invention to provide a device, a system and method with an improved operability and/or an increased ease of use during operation where an application (app) on a handheld device.

The object(s) underlying the present invention is (are) particularly solved by the features defined in the independent claims. The dependent claims relate to preferred embodiments of the present invention. Further additional and/or alternative aspects are discussed below.

The present invention is a new system for grading organisms in a fluid and a new device comprising a grading unit and a counter to use by a new method. The invention also comprises a system for the use of the method and a device in, for example, fish-farming.

It is the combination of a) using a concentration control chamber regulating the flow from the from the first and the second in-feed channel through the chamber, b) a counter for feeding information to the grading unit, and c) the use of feedback loops and software and user-data, which provides the improved method and device resulting in a better optimized grading process for a of flow of living organisms in a fluid. Not only does the invention provide better optimization of the grading process on the fly, but it also provides a tool for the use to monitor the process, to make small adjustments of the device to get better grading and to collect and store data on the grading process to be used in future grading projects.

The present invention provides a device for grading organisms, the device comprising a grading unit where the grading unit further comprises at least a pump and a grader and optionally a chamber for concentration control. The chamber for concentration control receives the flow from the first and the second in-feed channel through the chamber. The device also comprises a counter, two or more receptacles for receiving graded aquatic organisms and a computer where the counter sends information to the computer on the performance of the grading process. The computer compares the information from the counter to data stored in a database and sends feed-back signals to adjust the settings of each individual component of the grading unit during the process (on the fly) to optimize the grading process.

The invention further provides a system for grading organisms in a fluid comprising a grading unit where the grading unit further comprises at least a pump and a grader. The device also comprises a counter, two or more receptacles for receiving graded aquatic organisms and a computer where the counter sends information to the computer on the performance of the grading process. The computer compares the information from the counter to data stored in a database and sends feed-back signals to adjust the settings of each individual component of the grading unit during the process (on the fly) to optimize the grading process. In addition to the components listed above the device and the system may comprise a reservoir containing living organisms in fluid, such as fish in water, a reservoir containing fluid only, e.g. water. The system makes it possible to collect information from all the devices at the same time, process it and to compare information on size and number with data stored in a central database. This facilitates the optimization of the grading process as the various devices can be controlled and fine-tuned electronically in a dynamic and automatic way, e.g. "on the fly" during the grading process resulting in more precise grading-batches that give the desired output. As an example, if flow exceeds a predetermined capacity, the system adjusts the fish pump speed accordingly. In a similar manner, if the grading output is not what was desired, the system can adjust the grader accordingly. In addition to collect data and providing a centralized monitoring and operation control system, the system enclosed herein also performs automatic feedback control for key aspects of the grading process. The system allows for the usage of a feedback loop control of the equipment that forms the main part of the system. The readings from the counter give indication on the performance of the process. The data from the counter is sent to a central control system being a computer and database for processing the data with a software and then sends information to each individual component of the grading device on how the settings of the devices should be adjusted to control the output in order to optimize the process. The software uses in turn the gathered data from former grading processes that the central control system stores in a database to fine-tune the output.

The invention further provides a method for grading organisms in a fluid comprising the steps of:
a) feeding a flow of living organism in a fluid to a grading unit
b) grading the aquatic organisms using in the grading unit, said grading process further comprising at least:
  feeding the flow of living organism to a pump (4),
  pumping the flow of living organism towards a grader (5), and
  grading the of living organism in the flow by a grader (5),
c) determining the number, the size and the flow using a counter (6),
d) feeding the graded living organism into two or more receptacles (10).

The counter sends information to the computer on the performance of the grading process. The computer compares the information from the counter to data stored in a database and sends feed-back signals to adjust the settings of each individual component of the grading unit during the process (on the fly) to optimize the grading process.

The grading system disclosed has multiple feedback loops for optimizing the grading process for
  measuring concentration of fish in water and regulating the chamber for concentration control
  measuring the flow speed and controlling the pump
  measuring fish size and adjusting the grader settings The following embodiments and definitions relate to the method, fish-farm and the apparatus of the invention.

A device for grading aquatic organisms is provided. The device includes a pump, a grader, two or more receptacles for receiving aquatic organisms from the grader, a counter, and a control system. The grader comprises a rotating barrel with a plurality of chambers, a bottom part of each of the plurality of chambers having an adjustable slit. The control system is designed to adjust at least one of a rotation rate of the grader, or a slit setting of the grader based on information from the counter.

A system for grading aquatic organisms is provided and includes a pump, a grader, a first in-feed channel for a flow of aquatic organisms in a fluid, a second in-feed channel for a flow of fluid, a concentration control chamber, and a control system. The first in-feed channel includes a sensor for detecting a density of aquatic organisms. The concentration control chamber includes a lever. The control system is configured to regulate, with the lever, a ratio of flow from the first in-feed channel and the second in-feed channel to the grader in response to the density of aquatic organisms detected by the sensor.

In an embodiment of the present invention, the device further comprises a first in-feed channel for a flow of living organism in a fluid, where the first in-feed channel further comprising a sensor for detecting the density of living organism in the flow and a second in-feed channel for a flow of fluid.

In an embodiment of the present invention, the grading device further comprises a chamber for concentration control, where the chamber receives the flow from the first and the second in-feed channel. Furthermore, the chamber for concentration control comprises a lever for regulating the flow from the first and the second in-feed channel through the chamber.

In an embodiment of the present invention, the counter is a multi-channel counter receiving graded aquatic organisms from the grader. The counter may further comprise image means to determine the number and size of fish passing through each channel of the counter and the counter may also comprise flow-speed detecting means.

In an embodiment of the present invention, the first in-feed channel for a flow of living organism in a fluid (1) retrieves the living organism from a reservoir, such as a tank, pen, pond, In an embodiment of the present invention, the device further comprises one or more out-feed lanes feeding living organism from the counter to one or more of (but not limited to) a tank, pen, pond, transport vehicle or ship.

In an embodiment of the present invention, the settings for the individual components of the grading unit are adjusted to grade aquatic organisms according to predetermined criteria, said criteria being selected from size, shape, weight or number.

In an embodiment of the present invention, the settings of the individual components of the grading unit are adjusted through feed-back loops between the counter and the individual components of the grading unit, based on measurements from the counter, wherein a software calculates the optimal settings of the equipment based on data stored in the database.

In an embodiment of the present invention, the settings for the chamber for concentration control are adjusted through a feed-back loop between the counter and the chamber for concentration control, based on measurements from the counter, wherein a software calculates the optimal settings of the chamber for concentration control based on data stored in the database and updated settings parameters are sent to the chamber for concentration control (during the grading process.

In an embodiment of the present invention, the settings for the pump are adjusted through a feed-back loop between the counter and the pump, based on flow-speed measurements from the counter, wherein a software calculates the optimal settings of the pump based on data stored in the database and updated settings parameters are sent to the pump during the grading process.

In an embodiment of the present invention, the settings for the grader are adjusted through a feed-back loop between the counter and the grader, based on information on size distribution of the batches measured by the counter, wherein a software calculates the optimal settings of the grader based on data stored in the database and updated settings parameters are sent to the grader during the grading process.

In an embodiment of the present invention, an application on a computer or a handheld computing device sends information to the computer to modify the initial parameters for the chamber for concentration control, the pump, the grader and the counter to and thereby regulate flow speed, size distribution, counter and grader settings during the grading process.

In an embodiment of the present invention, the application monitors the concentration of living organisms in water, flow speed and size distribution, during the grading process.

In an embodiment of the present invention, the application allows a user to make manual changes to the settings of the individual components of the grading unit to modify the grading criteria.

In an embodiment of the present invention, the application allows a user to make manual changes to the settings of the suction through the first in-feed channel from a reservoir.

In an embodiment of the present invention, the data from the counter is collected and stored in the database. The collected data being stored in the database may be used for reporting verification of count or grading, documentation, re-counting, budgeting, maintenance, and tracing.

In an embodiment of the present invention, the system is used in fish farming to grade waterborne organisms, such as fish, smolt, shrimp, crustaceans, shellfish or other organisms living in freshwater or sea.

In an embodiment of the present invention, the pump controls the speed of the fluid flow through the pipelines and into the grader and counter.

The optimization of the grading process requires regulation of the grading units, which is performed in the following manner:

The concentration control mechanism: The concentration control chamber comprises a concentration sensor that analyses the flow of organisms in respect to their relative volume ratio to water. When the ratio is above a predetermined value (and thus the concentration of the organism in water) is higher than a specific value, a signal is sent to the controlling part which adjusts the settings accordingly. The process is fully automated. However, in order to achieve a more precise grading result, the counter sends the concentration control system information on the measured concentration inside the counter through a central control system. The information is used to calibrate the concentration control mechanism in order for it, in conjunction with the pumping speed, to achieve the optimal concentration of organisms in the flow resulting in a stream with a suitable amount of organisms per second that are delivered to first the grader and then the counter.

Pump speed adjustment: While the number of organisms in unit volume of water is regulated by the concentration control chamber, the pump controls the speed with which the fluid flow moves through the pipelines and into the grader and counter. The counter measures the velocity of flow and sends the information to the pump in order to regulate the pumping speed. As one setup of the system can vary significantly from another depending on the length of pipelines between the equipment and different levels of elevation at the output of the destination receptacles, the flow speed within the pipes for a fixed power setting of the pump can vary considerably. Thus, it's important to measure the flow speed at the end of the process line, i.e. at the counter, as thats where it has the highest influence on the performance of the system.

Controlling grader settings: The grader in the process line sorts the fish into groups depending on their size. In one embodiment of the invention the grader functions by dropping the fish into chambers with an adjustable bottom. A motor rotates the chambers from one position to another, while a slit on the bottom of the chamber gradually widens. Both the rate of rotation and the expansion of the slits can be adjusted by the control unit of the grader.

The feedback loop between the counter and grader can relieve the user from having to monitor the grading process manually and can result in an optimal distribution achieved between each grading category.

The counter measures both size and number of fish that passes through the grader in each grading category (typically there are 2 to 4 categories). The counter can thus estimate the relative size distribution of each category and the accumulated biomass.

By integrating a feedback loop between the grader and the counter, both slit and rotation settings of the grader can be adjusted to reach the optimal quantity of fish in each category. As an example, if an equal biomass distribution is preferred between all categories, the counter will adjust the grader so that the category with e.g. small fish receives the largest number of fish to adjust for the relative weight difference of each individual fish.

All of these examples of automatic feedback loops are controlled by a software which connects to each of the individual devices (concentration control unit, pump, grader and counter), rather than the devices connecting to one another. Thus, the measured value from the counter is first interpreted by the software and which in return makes a decision on the appropriate action or change in settings. The software then sends the required information towards a device where the change is performed.

Another aspect of the software is a database accumulating and storing all data gathered in the process. The information is accessible for supervisors to review the history of grading operations and to do analysis on individual category aspects such as average fish size, variation of fish size, number of fish etc.

BRIEF DESCRIPTION OF THE DRAWINGS

The skilled person will understand that the drawings, described below, are for illustration purposes only. The drawings are not intended to limit the scope of the present teachings in any way.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

It should be appreciated that the invention is applicable for grading living organisms in a fluid for fish farming. In general, therefore, the concentration control chamber, the grader and the counter may be of any kind used in grading living organisms in a fluid.

Figure 1:
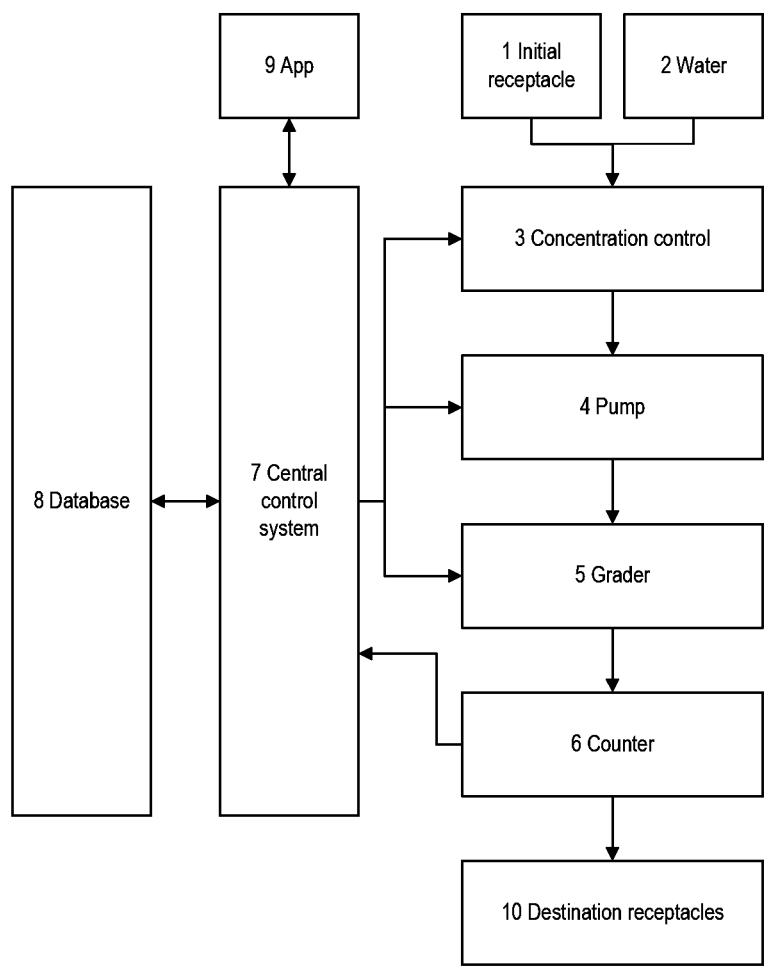
FIG. 1 is a flow-chart diagram of the system showing both flow direction as well as control signal exchange between the devices.

FIG. 1 shows a flow-chart diagram of the system showing both flow direction and control signal exchange between the devices. The numberings are as follows:
1. A reservoir containing living organisms in fluid, such as fish in water.
2. A reservoir containing fluid only, e.g. water.
3. A concentration control chamber that, based on the measurements of a sensor unit situated upstream, controls the amount of water used to dilute the stream of organisms-containing fluid.
4. A pump.
5. A grader that grades the organisms by size.
6. A counter that records images of the flow and analyses them in order to estimate fish count, concentration, fish size and accumulated biomass.
7. A central control software that controls the equipment.
8. A database that stores data from the measurements.
9. An application ("app") that is used to operate the central control system.

The system combines proven processes of grading and counting with a recently invented process for controlling concentration of fish and uses feedback from censoring devices to calibrate and adjust settings of equipment involved in the processes in order to enhance performance and process quality. The fish counter (6) performs various measurements while counting the fish. It records both size of individual fishes and the frequency by which they enter the counter. This frequency is a product of the velocity of water and the relative concentration of fish within the water.

Figure 4:
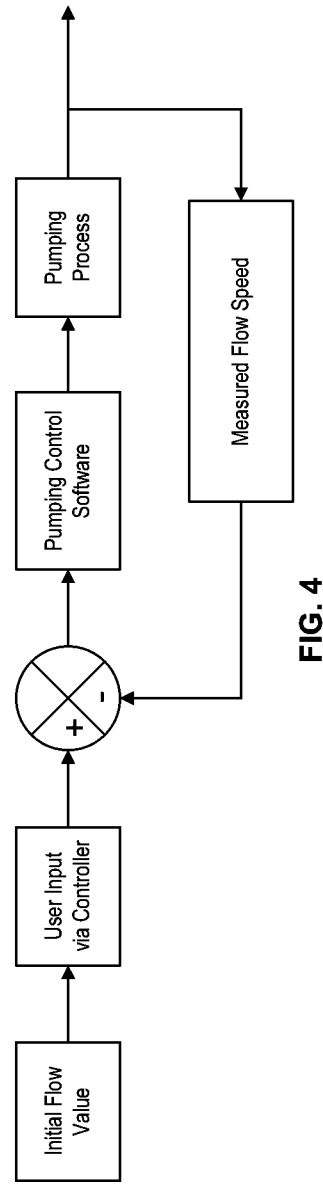
FIG. 4 is a schematic illustration of the feedback loop controlling the pump settings.
Figure 5:
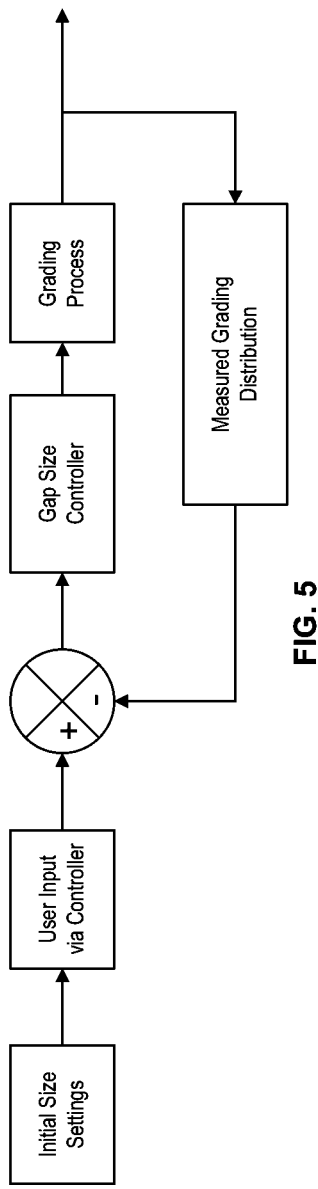
FIG. 5 is a schematic illustration of the feedback loop controlling the grader slit size settings.

The water velocity is affected by changing the pump (4) settings, which is done with automatic feedback control between counter and pump which is described in FIG. 5. Similar feedback loops are in place to adjust both the settings of the concentration control mechanism (4) which is described in FIG. 4 and the grader (5) which is described in FIG. 6.

The central control system (7) which handles communication and feedback control is a specially designed computer program which uses an algorithm to evaluate optimal settings for each device by interpreting the data sent from the fish counter (6). Once the optimal settings are estimated, the program sends commands to the corresponding device to update its settings. The command is received and interpreted by a controlling computer located in each of the devices. The computer then adjusts the settings of each device accordingly in real time ("on the fly").

In case of the concentration control mechanism, the automatic feedback adjusts a parameter that is directly responsible for the gain of the concentration sensor. The concentration control mechanism adjusts relative cross-sectional area between the pipe carrying fish and the pipe carrying only water depending on the concentration measured previously. The amplitude of the change is affected by the gain and thus the feedback controlled parameter.

The entire grading process can be both controlled and monitored using an application (8) for a "smart device" such as a smartphone or a tablet. The central control system (7) sends information relative to the grading process to the device so that the user is able to track the concentration of fish within the pipeline, the rate with which the water is moving through the pipeline (flow speed), the size distribution within each category as measured in the fish counter (6) and various other information related to the grading process. Thus, the user can monitor the grading process's key performance indicators on the device and is therefore less confined to pay close attention to the mechanism itself. The user can influence the settings of each device individually by using the device and is able to change each setting even during the grading process.

Additionally, the user can define working ranges for each measured variable and have the application notifying him whenever a variable is measured to be outside of the predetermined range. Thus, the application serves a security role by reducing the risk of mishaps during the grading process.

Figure 2:
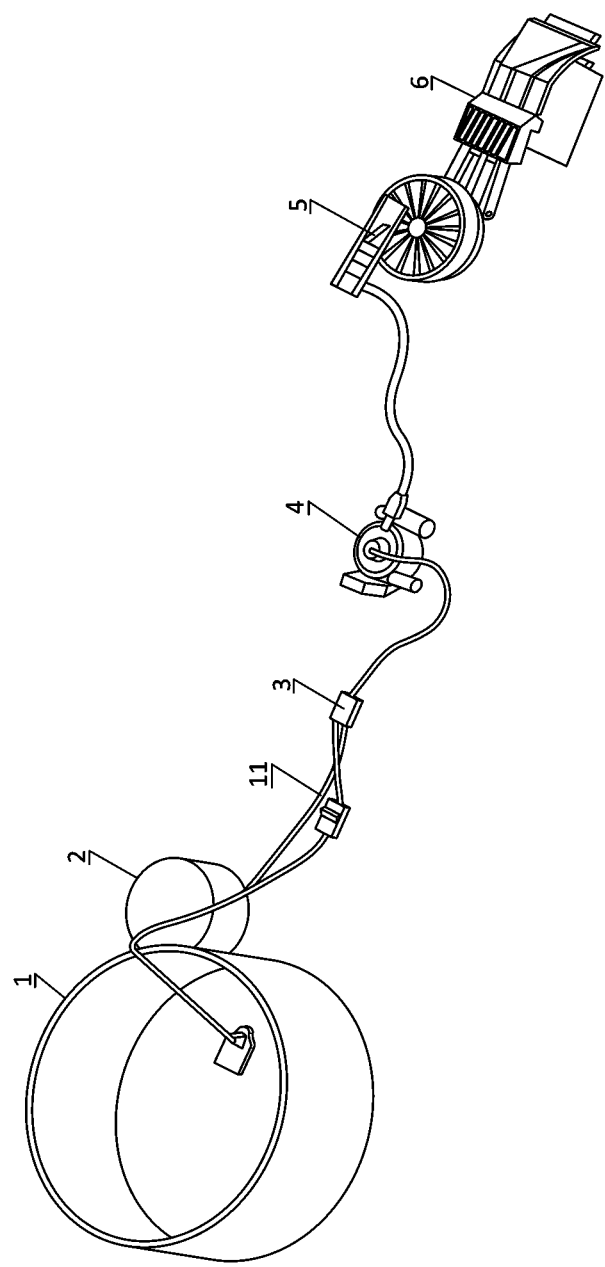
FIG. 2 is an illustration of the system setup, including the devices comprising the system.

FIG. 2 shows the systems mechanical setup, including the devices comprising the system. Pipes are connected to two receptacles, one containing fish within water (1) and the other containing only water (2). The pipe containing both fish and water is lead through concentration measurement equipment (11) which evaluates the concentration of fish and delivers the information to a computer program, which evaluates the correct response for the concentration control system. The pipes are combined within the concentration control system (3) where a valve controls the ratio between the two inputs of which the output flow consists of. Thus, the concentration of fish in water is diluted below a set value to insure the quality of both grading and counting. After passing through the concentration control system, the fish travel onward through a centrifugal pump (4) which drives the fish from the initial receptacle (1) towards the end receptacles (10). From the pump, the fish travels into the grader (5) which sorts the fishes by size and delivers each size category into separate channels. Each channel carries the fish into the counter (6) where measurements are performed "on the fly". After the sorting and counting, the fish is delivered into an end receptacle (10) along with the rest of the fish belonging to the same size category.

Figure 3:
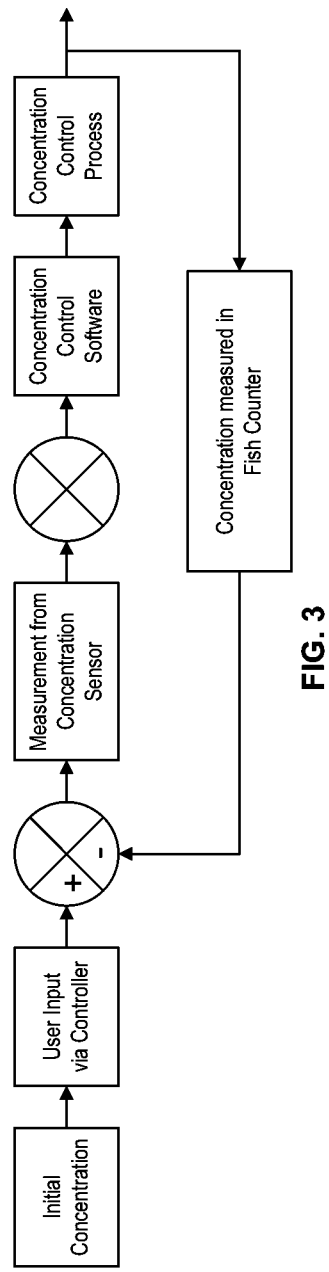
FIG. 3 is a schematic illustration of the feedback loop controlling the concentration control mechanism settings.

FIG. 3 shows the feedback loop controlling the settings of the concentration control mechanism (3). The initial input value of the concentration control device is pre-set to a value suitable for most types of setup. This pre-set value can be modified by the user via the on-board controller or mobile application. The concentration measured in the fish counter is then subtracted from the input value and the outcome is added to the value measured in the concentration sensor. The sum is fed into the concentration control software which in return adjusts the concentration control mechanisms settings during the control process. The concentration is measured again towards the end of the grading process in the fish counter and used as described above.

The counter (6) measures the size of fish passing through it and can thus give a measurement on the quality of the sorting performed by the grader (5). The central control (7) system receives size information for each category and evaluates the quality of the sorting process. When sorting quality deteriorates, the program adjusts and sends a parameter to both the concentration control mechanism (3) in order to reduce the concentration of fish and to the grader (5) to increase the speed of barrel rotation.

Additionally, the counter (6) measures the number of fish in each category and estimates biomass. According to user preference, the centralized control system (7) receives this information from the counter (6) and adjusts the rate of increase of the slit to ensure that the correct amount of biomass is delivered into each category of the destination receptacles (10).

FIG. 4 shows the feedback loop controlling the pump (4) settings. The initial input value for flow speed is pre-set to a value suitable for most types of setup. This pre-set value can be modified by the user via the on-board controller or mobile application. The flow speed measured at the fish counter is then subtracted from the input value and the outcome is fed into the pumping control software. The software adjusts the pump settings during the pumping process. The flow speed is measured at the fish counter and used as described above.

The feedback parameter for the pump (4) affects the frequency of the inverter driving the main propeller. Thus, the parameter affects the power with which the water is pumped through the system. By measuring both the frequency by which fishes go through the fish counter (6) and the concentration of fish within the water, the velocity of the flow can be estimated. The pump parameter is controlled via the feedback control so that the velocity is within a preferred interval in order to improve the efficiency of the system. This affects the speed of fish going through the grader.

FIG. 5 shows the feedback loop controlling the grader (5) slit/gap size settings. The initial input value for the grader's (5) gap size is pre-set to a value suitable for the average size distribution for the given age of fish. Users can adjust the input values on the on-board controller or mobile application. The distribution is measured in the fish counter and the values sent to the grader control software which compares the measured distribution with the input settings. The gap size controller software applies changes to the grader settings "on the fly" during the grading process.

The fish grader's feedback control manipulates two parameters that in return affect the operation of the mechanism. The grader (5) consists of a large barrel that is segmented into several chambers. The bottom part of each chamber has an adjustable slit where the fish can escape from the chamber. As the fish is dropped into the grader, it is guided into one of the several chambers. The barrel is rotated around its center axis by a rotary motor and thus fish that arrives later slides into a different chamber than a fish that arrived previously. As the barrel rotates, the slit in the bottom of each of the chamber is gradually increased, until finally the slit is large enough for the fish to escape through. Thus, smaller fish will escape earlier than larger fish as the rate increase in slit size is kept constant. By collecting fish depending on the location of their escape, a separation by size is acquired.

The grading process is sensitive to the frequency with which fish arrives in the grader (6). When the frequency is too high, the fish will pile up in the chambers and only the fish on the bottom of the chamber is exposed to the slit. This hinders the smaller fish from escaping through the slit and results in them being categorized with larger fish. This is solved by reducing the amount (concentration) of fish that go into the grader.

At the end of the grading process, the fish go through the fish counter. Within the fish counter, the flow of fish and water passes by a light source and a camera located so that it captures the silhouette created when a fish passes by the light source. The image is analyzed and both size and weight of the fish are evaluated by the counter's software. The measurements are then used as inputs for the feedback loop system as described above.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components.

Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

What is claimed is:

1. A device for grading organisms, the device comprising:
a pump;
a grader;
two or more receptacles for receiving graded aquatic organisms from the grader;
a counter configured to provide measurements of a rate at which fluid is moving through the device; and
a control system,
wherein the control system is configured to adjust settings for the pump through a feed-back loop between the counter and the pump based on the measurements of the rate at which fluid is moving through the device, wherein the control system is configured to calculate optimal settings of the pump based on data stored in a database and to send updated settings parameters to the pump during the grading process.

2. The device according to claim 1, wherein the control system is configured to adjust the settings of one or more individual components of the grader to grade aquatic organisms according to pre-determined criteria, the criteria being selected from size, shape, weight or number.

3. The device according to claim 1, wherein the pump controls a speed of fluid flow into the grader and counter.

4. The device according to claim 1, wherein the grader further comprises one or more out-feed lanes feeding the aquatic organisms from the counter to the two or more receptacles, including one or more of a tank, a pen, a pond, a transport vehicle and a ship.

5. The device according to claim 1, wherein the control system is configured to adjust the settings of one or more individual components of the grader through feedback loops between the counter and the one or more individual components based on measurements from the counter, wherein the control system is configured to calculate optimal settings of the one or more individual components based on data stored in the database.

6. The device according to claim 1, wherein the counter is configured to send information to the control system on a performance of the grading process, wherein the control system is configured to compare the information from the counter to data stored in the database and is designed to adjust a speed of the pump, during the grading process.

7. The device according to claim 1, wherein the control system is configured to adjust settings for the grader through a further feed-back loop between the counter and the grader, based on information on size distribution of the aquatic organisms measured by the counter, wherein the control system is configured to calculate optimal settings of the grader based on data stored in the database and to send updated settings parameters to the grader during the grading process.

8. The device according to claim 1, and further comprising an application on a computer or a handheld computing device configured to allow a user to make manual changes to the settings of one or more individual components of the grader.

9. A system for grading aquatic organisms, the system comprising:
a pump;
a grader;
a first in-feed channel for a flow of aquatic organisms in a fluid;
a sensor for detecting a density of aquatic organisms;
a second in-feed channel for a flow of fluid;
a concentration control chamber, the concentration control chamber including a valve; and
a control system, the control system configured to regulate, with the valve, a ratio of flow from the first in-feed channel and the second in-feed channel to the grader in response to the density of aquatic organisms detected by the sensor.

10. The system according to claim 9, wherein the first in-feed channel is connected to a reservoir containing aquatic organisms, including one of a tank, a pen, and a pond.

11. The system according to claim 9, wherein the first in-feed channel and the second in-feed channel are combined within the concentration control chamber.

12. The system according to claim 9, further comprising a counter configured to send information to the control system on a performance of the grading process.

13. The system according to claim 12, wherein the control system is configured to calibrate the concentration control chamber based on information from the counter.

14. The system according to claim 12, wherein the counter comprises a flow-speed detecting means.

15. The system according to claim 12, wherein the counter is a multi-channel counter receiving graded aquatic organisms from the grader.

16. The system according to claim 12, wherein the counter comprises image means to determine a number and size of aquatic organisms passing through each channel of the counter.

17. The system according to claim 12, wherein the control system is configured to adjust the settings for the concentration control chamber through a feed-back loop between the counter and the concentration control chamber based on measurements from the counter, wherein the control system is configured to calculate optimal settings of the concentration control chamber based on data stored in a database and to send updated settings parameters to the concentration control chamber during the grading process.

18. A device for grading aquatic organisms, the device comprising:
a first in-feed channel for a flow of aquatic organisms in a fluid;
a sensor for detecting a density of aquatic organisms;

a second in-feed channel for a flow of fluid;
a concentration control chamber, the concentration control chamber including a valve;
a grader;
a counter; and
a control system, wherein the control system is designed to:
regulate, with the valve, a ratio of flow from the first in-feed channel and the second in-feed channel to the grader in response to the density of aquatic organisms detected by the sensor.

* * * * *